Figure 1:
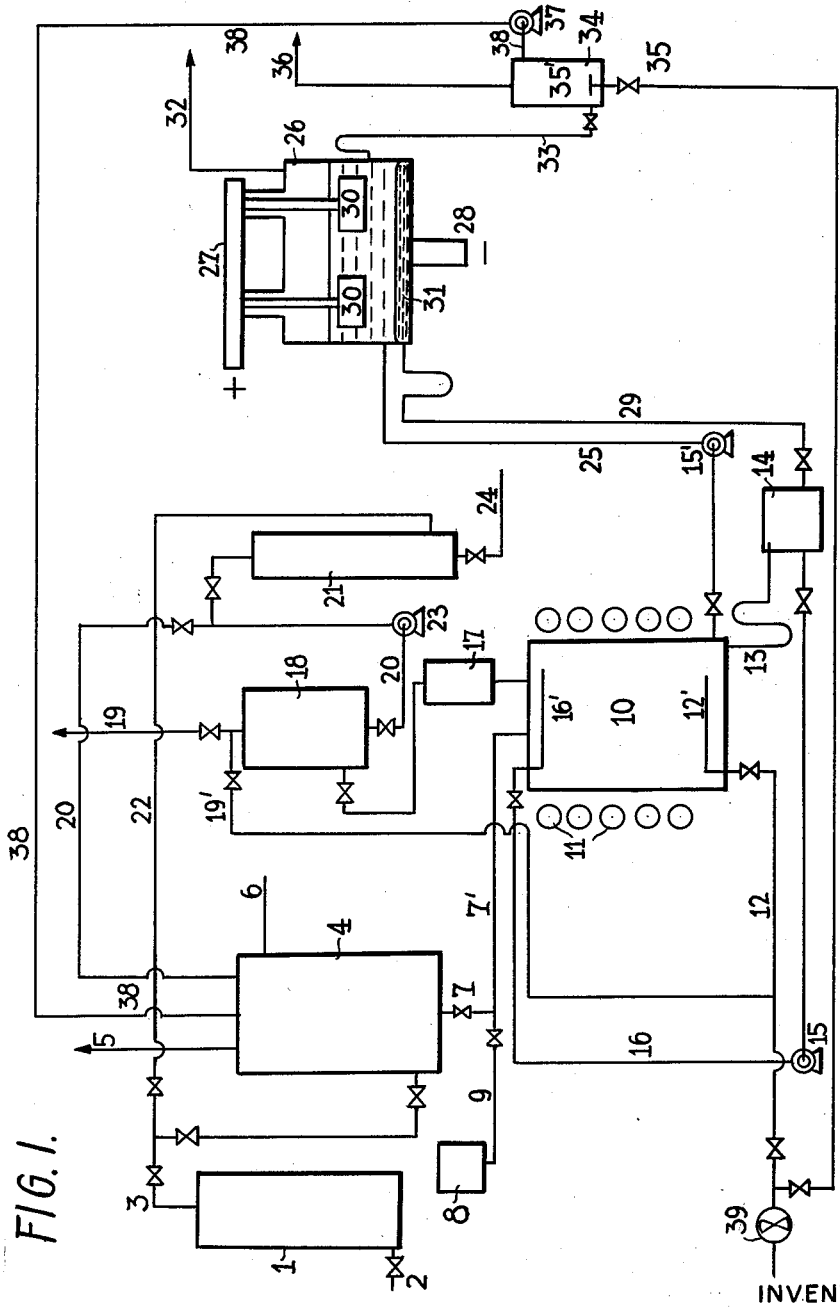

INVENTORS
WOLFGANG TESKE
HANS HOLEMANN

April 14, 1964   W. TESKE ETAL   3,129,152
PROCESS FOR THE ELECTROLYTIC RECOVERY OF CHLORINE
FROM HYDROGEN CHLORIDE OR HYDROCHLORIC ACID
Filed Aug. 9, 1960   4 Sheets-Sheet 2

INVENTORS
WOLFGANG TESKE
HANS HOLEMANN
BY
Curtis, Morris & Safford
ATTORNEYS

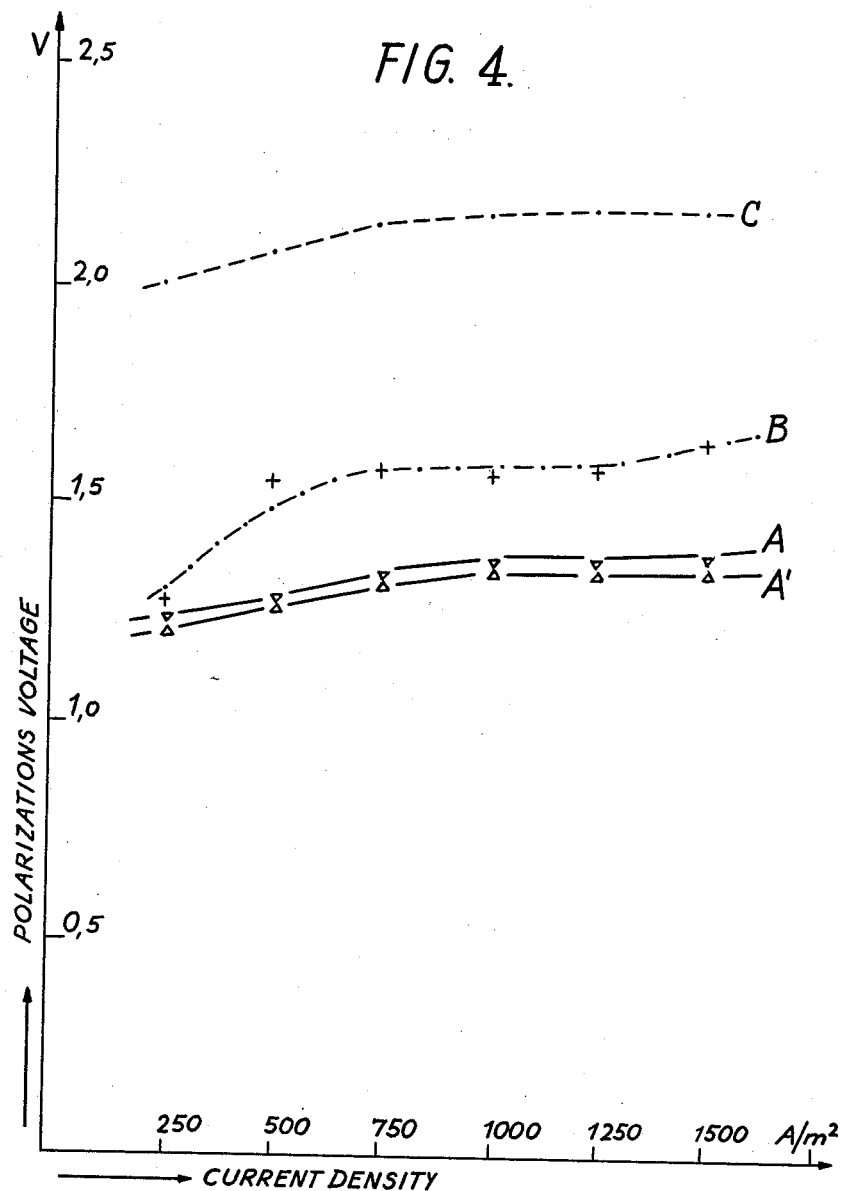

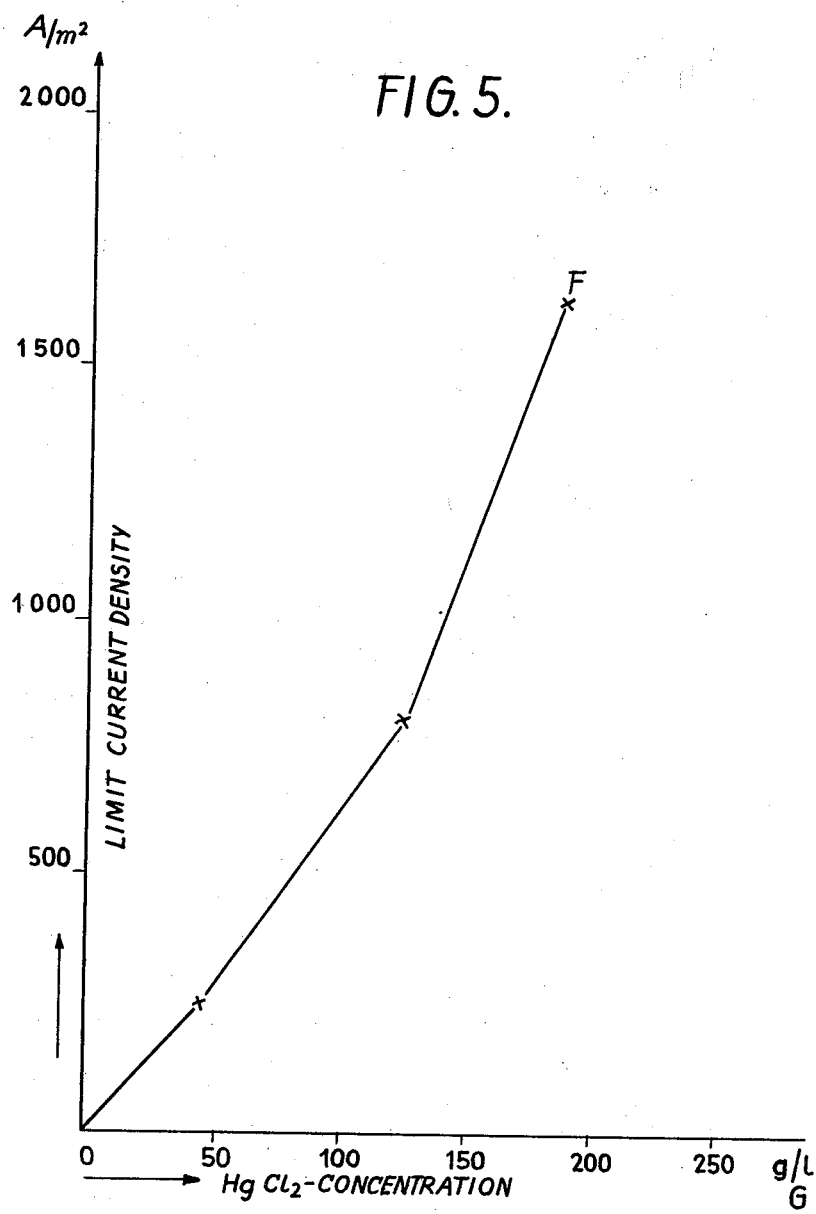

United States Patent Office 3,129,152
Patented Apr. 14, 1964

3,129,152
PROCESS FOR THE ELECTROLYTIC RECOVERY OF CHLORINE FROM HYDROGEN CHLORIDE OR HYDROCHLORIC ACID
Wolfgang Teske, Bad Soden, Taunus, and Hans Holemann, Kronberg, Taunus, Germany, assignors to Farbwerke Hoechst Aktiengesellschaft vormals Meister Lucius & Brüning, Frankfurt am Main, Germany, a corporation of Germany
Filed Aug. 9, 1960, Ser. No. 48,403
Claims priority, application Germany Aug. 12, 1959
12 Claims. (Cl. 204—128)

The present invention relates to a process for the electrolytic recovery of chlorine from hydrogen chloride or hydrochloric acid.

When in organic compounds hydrogen is substituted by chlorine, half of the chlorine present is converted into hydrogen chloride and thus is lost to the chlorination process proper. Therefore, the recovery of chlorine from this often undesired by-product has become an important industrial problem. For this purpose two methods can, in principal, be applied; the hydrogen chloride formed is reacted with air or oxygen in the presence of a catalyst to obtain water and chlorine as has been described in former and more recent processes, for example in the Deacon process; or the gaseous hydrogen chloride formed is absorbed in water or dilute hydrochloric acid with formation of hydrochloric acid, and the hydrochloric acid produced is electrolyzed, hydrogen and chlorine being thus obtained.

Various attempts have been made to reduce the expenditure of energy in the electrolysis of hydrochloric acid, which expenditure is composed of three parts, i.e., the expenditure of energy for the evolution of chlorine at the anode, for overcoming the internal resistance of the electrolytic cell (in the electrolyte and diaphragm) and for the evolution of hydrogen at the cathode. Since, for practical reasons, only an evolution of chlorine at the graphite electrodes comes into consideraton, the expenditure of energy and voltage, which are used for the evolution of chlorine, cannot be influenced. The conditions are different with the cathode, where the evolution of hydrogen at the graphite electrodes takes place with a certain overvoltage.

A possibility of avoiding or at least reducing the last-named drawback consists in that the cathodic hydrogen evolution is replaced by another cathodic process which requires a lower degree of voltage at the cathode than the evolution of hydrogen.

Attempts have already been made (cf. U.S. Patent No. 2,468,766) to reduce metal ions from a higher valence to a lower valence in the electrolyte solution, for example $Fe^{+++} \rightarrow Fe^{++}$ or $Cu^{++} \rightarrow Cu^{+}$, instead of discharging $H^+$ ions at the cathode. Such a reduction occurs at a voltage lower than that for the cathodic evolution of hydrogen because of the redox potential values for the reactions in question.

By the afore-described step the evolution of hydrogen is avoided and measures for separating cathode gas and anode gas, in particular, become superfluous.

At the same time, the consumption of voltage and energy is reduced. A drawback of this mode of operating consists in that the metal ions of low valency, which have been dissolved in the electrolyte and have already been reduced, can be oxidized at the anode, whereby loss of current occurs. The electrolyte which has been reduced at the cathode, has, therefore, immediately to be removed from the cathode, for example, according to the hitherto known suggestions, through a porous cathode having an exactly prescribed permeability.

We have now found a process for the electrolytic production of chlorine from aqueous hydrochloric acid whereby all the drawbacks described of the known processes are avoided and which at the same time involves a considerable reduction of the voltage in comparison with the known processes. The process of the invention is characterized in that aqueous hydrochloric acid (as it is obtained, for example, by the absorption of gaseous hydrogen chloride in water or dilute aqueous hydrochloric acid—which hydrogen chloride is formed as a by-product during the industrially widespread chlorination reactions) is reacted with oxygen and/or oxygen-containing gaseous mixtures, in particular air, and metallic mercury with the addition of a catalyst accelerating the oxidation process at a temperature in the range of at least 40° C. and the boiling point of hydrochloric acid reaction solution, preferably in the range of 60° C.–100° C., with formation of dissolved mercury-(2)-chloride. The hydrochloric acid solution containing mercury-(2)-chloride thus formed is electrolyzed, during which process chlorine is formed at the anode and metallic mercury at the cathode. The metallic mercury is returned to the mercury supply serving for the preparation of mercury-(2)-chloride. The electrolyte poor in mercury-(2)-chloride and obtained from the electrolytic stage—if desired, after having been freed from its chlorine content—is returned into the cycle of the process, in particular as absorbent for the gaseous hydrogen chloride so that aqueous hydrochloric acid can be formed. Water produced during the oxidation of mercury to mercury-(2)-chloride is continuously removed from the cycle.

According to the invention salts of metals having at least two different valences, the higher valence of which has a sufficient oxidizing power with respect to metallic mercury and mercury-(1)-chloride and the lower valence can be re-oxidized to the higher valence by means of the oxidizing agents used, for example oxygen or air, have proved to be useful catalysts for the reaction of the aqueous hydrochloric acid solution with metallic mercury and oxygen and/or gaseous mixtures containing oxygen, in particular air. Salts of said kind can be effective either as such or in combination with each other as catalysts for the dissolution of mercury and the simultaneous oxidation of hydrogen chloride.

Since mercury is a relatively noble and, therefore, sparingly oxidizable metal, it can only with some difficulty be oxidized with molecular oxygen and aqueous hydrochloric acid to obtain $HgCl_2$, even if the oxidation is performed at an elevated temperature, while finely subdividing the reaction components. Only by the addition of the afore-named catalysts according to the present invention is the rate of oxidation of mercury to form mercury-(2)-chloride considerably increased, so that the reaction can be carried out on an industrially useful scale. Especially useful catalysts for this stage of the process are, in particular, iron-(3)-chloride and copper-(2)-chloride, used as such or in admixture with one another or with the other metal compounds such as palladium chloride, cobalt chloride, molybdates and vanadates. In Examples 1 to 5, 8 and 10 to 16 hereafter, there are described the use of the catalysts according to the invention and their mode of acting and usefulness under various experimental conditions, without limiting them thereto.

For carrying out the process of the invention it has been found advisable to react the oxygen and/or the gaseous mixtures containing oxygen, in particular air, and the liquid mercury in a finely subdivided form with the aqueous hydrochloric acid solution.

According to the process of the present invention the hydrochloric acid-$HgCl_2$-solution is advantageously electrolyzed between a graphite anode and a solid cathode made of graphite or a metal with a low overvoltage with respect to the separation of mercury, or between a graphite anode and a mercury cathode; in this case the current density applied has to be below the limiting current density required for the evolution of hydrogen at the cathode.

The water that has formed in the oxidation stage of the metallic mercury to mercury-(2)-chloride in the presence of hydrochloric acid is advantageously removed by volatilization from the oxidation stage, whereby the condensate that has formed must contain a smaller amount than, but at most the same amount of hydrogen chloride as the azeotropic $HCl$—$H_2O$-mixture.

A further suitable method of carrying out the process of the present invention consists in that the condensate that has formed and contains at most the hydrogen chloride concentration corresponding to that of the azeotropic $HCl$—$H_2O$-mixture, is once more saturated with gaseous hydrogen chloride. Its water content is thus separated from the cycling process in the form of concentrated hydrochloric acid.

The process of the invention for the electrolytic recovery of chlorine from gas hydrogen chloride obtained during the chlorination of organic substances is illustrated by way of example with reference to FIGURE 1 of the accompanying drawings. Chlorine is supplied through conduit 2 to the chlorination vessel 1. The hydrogen chloride that has formed during the chlorination of the organic substances is passed via conduit 3 to an absorption vessel 4 of known construction where it is absorbed in an absorption liquid, preferably in the electrolyte poor in $HgCl_2$ and derived from the electrolysis, or, if desired, in the distillate originating from the oxidation step described hereinafter. This distillate is conducted to the absorbing system 4 through conduit 20. It is, moreover, possible to add water through conduit 6 and to remove the residual waste gases through conduit 5, said waste gases consisting, for example, of organic compounds of the chlorination stage. The aqueous hydrochloric acid which has become more concentrated in the absorption vessel 4 is passed via conduits 7 and 7' to the oxidation vessel 10 which may, for example, be constructed in the form of a reaction tower of corresponding dimensions. The quantities of catalyzing substances required for the oxidation are supplied from container 8 through the conduits 9 and 7'. In the oxidation chamber 10 which is heatable, for example by means of heating tubes or heating coils 11, mercury is converted into $HgCl_2$ according to the equation

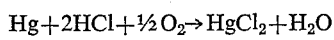

by contacting therein by suitable means the afore-named solutions of catalyst and hydrochloric acid with oxygen and/or gases containing oxygen, such as air, and metallic mercury, preferably in a finely subdivided form. The desired reaction can be effected, for example by intimately stirring a mercury sump in a hydrochloric acid solution which is intermingled by air bubbles or oxygen bubbles respectively, i.e., in a stirring device; or the reaction may be effected by trickling mercury in a solution containing fine air bubbles or oxygen bubbles, for example through a reaction tower or another suitable device. FIGURE 1, for example, diagrammatically illustrates a tower-shaped oxidation device. Air leaves a ventilator 39 and is blown through conduit 12 and an air distributor 12' in a finely subdivided form into the oxidation chamber 10. Mercury leaves the storage vessel 14 and is introduced by means of a pump 15 via conduit 16 and a distributor 16' in a finely subdivided form into the oxidation chamber, while the hydrochloric acid solution participating in the oxidation flows into the oxidation chamber 10 via conduit 7'. The non-reacted mercury leaves the oxidation chamber 10 via a conduit 13 which is provided with suitable closing means, for example a siphon, and returns into the storage vessel 14. The excess air which is charged with hydrochloric acid vapors passes two condensers 17 and 18. It is then carried off via a conduit 19 or, if desired, it is cycled via a conduit 19' to conduit 12 from where it enters into the oxidation chamber 10. The condensate which has separated in the condenser 17 is returned into the oxidation chamber 10 if it still contains some metal salts. The condensate free from metal salts which is formed in condenser 18 is pumped by means of a pump 23 via a conduit 20 into another absorber 21 and saturated therein with a fresh portion of hydrogen chloride which, after having left the chlorination vessel 1, entered the absorber 21 through the conduits 3 and 22. The aforenamed metal-free condensate is then removed via a conduit 24 in the form of concentrated hydrochloric acid. By this method of operating there is removed from the cycle a part or, if desired, the total portion of the water formed during the oxidation of mercury to $HgCl_2$ in the reaction vessel 10. Instead of eliminating the water at the place of the electrolytic cycle as illustrated in FIGURE 1, it is also possible to remove the water, formed according to the equation

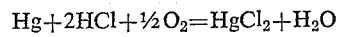

at some other places. If it would not be removed, it would unduly dilute the cycling electrolyte. The water can be eliminated, for example, by means of Joule's heat which evolves in the electrolytic cell 26 and causes the chlorine passing through conduit 32 to be charged with steam or with hydrochloric acid vapors in correspondence with the temperature and the concentration conditions applied. The water and the aqueous hydrochloric acid can then be removed, if desired by cooling and drying units of the usual construction, from the chlorine which has formed in the electrolytic cell. If it is desired simultaneously to receive chlorine from the electrolyte, it is also possible to evaporate, for example by a current of air, the water and the hydrochloric acid from the electrolyte which is poor in $HgCl_2$ and leaves the electrolytic cell in a hot state. Another possibility consists in an evaporation under reduced pressure.

The hydrochloric acid-mercury chloride solution which is formed in the oxidation vessel 10 is passed by means of a pump 15' through the conduit 25 to one or several electrolytic cells 26 where the dissolved mercury-(2)-chloride is decomposed into mercury and chlorine.

In FIGURE 1 there is illustrated, for example, an electrolytic cell which is provided with a liquid cathode consisting of mercury (31) and arranged in a horizontal position and two horizontally arranged graphite anodes (30) with the power supplies 28 and 27 belonging thereto. Electrolysis may, however just as well be carried out in other arrangements of the cell, for example with vertically mounted liquid cathodes or vertically mounted rigid cathodes made of, for example, graphite or a metal wettable with mercury, such as copper, nickel or alloys (Monel metal). The mercury (31) which has separated in the electrolytic cell is cycled through conduit 29 to storage vessel 14 and then to the oxidation chamber 10. The chlorine which has formed at the anodes leaves the electrolytic cell via a delivery pipe 32, and the electrolyte which is poor in mercury-(2)-chloride passes through the delivery pipe 33 and, if desired, it may be freed from its chlorine content in a blow-off tower 34 by means of a current of air which is supplied via a conduit 35 and subdivided in the distributor 35'. The chlorine-containing air leaves the blow-off tower through the conduit 36 and the electrolyte poor in chlorine is reconducted by means of a pump 37 and a conduit 38 into the absorption vessel 4 where gaseous hydrogen chloride is absorbed. If desired, the delivery pipes 32 and 36 may be provided with means for the separation of entrained droplets of liquid and with a condenser serving for the separation of volatilized hydrochloric acid and thus for the removal from the cycle of the water which forms in the oxidation vessel 10.

For clearness' sake the storage vessels and the conveyor which are mounted between the various parts of the device are not shown in FIGURE 1 of the accompanying drawings.

The succession of the partial steps which is characterized for the present process, namely absorption of hydrogen chloride, oxidation of mercury and hydrochloric acid with oxygen or oxygen-containing gaseous mixtures to obtain mercury-(2)-chloride and water, the removal of the water formed and the electrolytic decomposition of mercury chloride produced during the oxidation may be combined in any desired succession. Contrary to the description of the process to be carried out according to FIGURE 1, gaseous hydrogen chloride may also be introduced between the oxidation and the electrolytic process.

Figure 2:
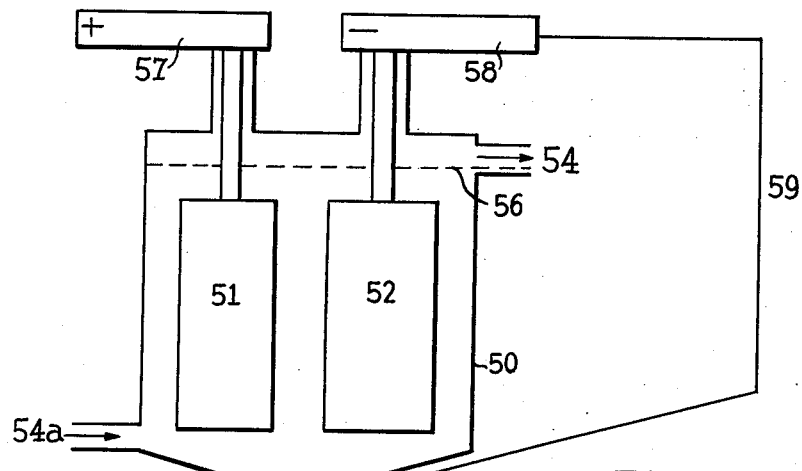
Figure 3:
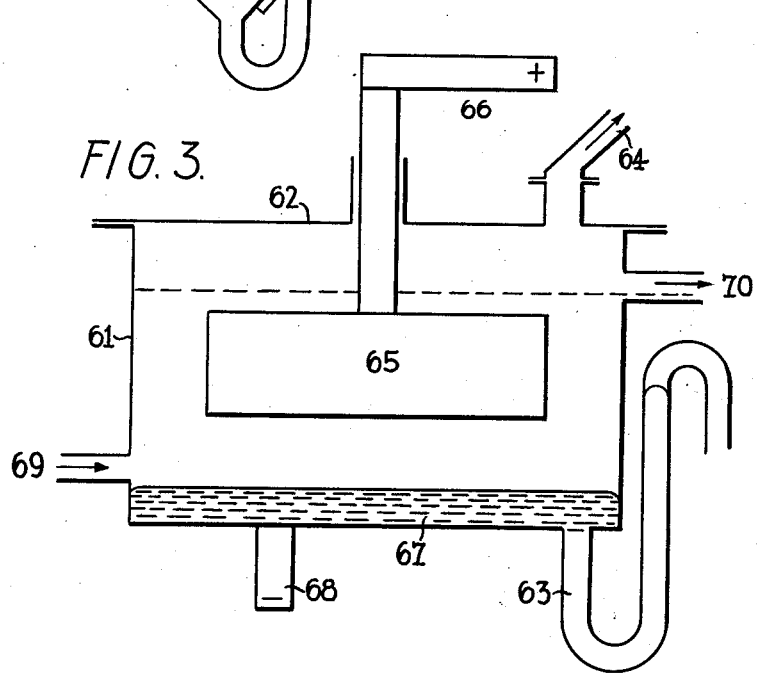

The electrolytic cells wherein electrolysis of the hydrochloric acid-mercury-(2)-chloride solution is performed according to the process of the present invention may be of various constructional forms, the most useful ones being illustrated in FIGURES 2 and 3 of the accompanying drawings. As illustrated in FIGURE 2 electrolysis may be carried out, for example, between two rigid electrodes, 50 being the electrolytic vessel, 51 the anode and 52 the cathode which, via the power supplies 57 and 58 are connected with a suitable direct-current source. In this case the anode advantageously consists of graphite and the cathode likewise consists of graphite or an amalgamated metal which is resistant to the hydrochloric acid-mercury-(2)-chloride solution (for example amalgamated nickel), or an amalgamated metal alloy, such as Monel on which mercury is separated at only a slight overvoltage. As illustrated in FIGURE 2, the electrolytic cell is filled with electrolyte up to 56 and provided with a supply pipe 54a for the fresh electrolyte and delivery pipes for the chlorine that forms and the spent electrolyte (illustrated in FIGURE 2 together as delivery pipe 54), and for the mercury which separates at the cathode, trickles down therefrom and collects at the bottom of the vessel in a suitably shaped sump 55, provided for example with a siphon. It is of advantage to connect the mercury collected at the bottom of the cell via metallically conducting connection 59 with the negative power supply 58, so as to effect a cathodic polarization.

It is of advantage to effect the electrolytic decomposition of the hydrochloric acid-mercury-(2)-chloride solution between a mercury cathode and a graphite anode. An electrolytic cell suitable for this method of operating is illustrated, by way of example, in FIGURE 3. A graphite anode 65 and opposite thereto a mercury cathode 67 are mounted in a horizontal position in the electrolytic cell 61. Both electrodes are supplied with direct current by the current connecting means 66 and 68. The lid 62 of the cell is provided with a delivery pipe 64 for the chlorine that forms. The electrolyte is introduced through conduit 69, and the electrolytic cell is filled therewith up to the delivery pipe 70. After the required proportion of mercury has separated, the electrolyte leaves the cell through the conduit 70. The mercury which has separated can be withdrawn from the cell by means of a suitable checking device, for example a siphon 63. When this method of operating is applied, it is also possible to introduce, for rinsing purposes, elementary mercury, for example through the electrolyte-supply pipe 69.

For carrying out the electrolysis according to the present invention, it is, furthermore, of advantage to use electrolytic cells wherein the operating mercury cathode is mounted in a vertical or inclined position, and more particularly those constructions wherein one or several metal discs or a metallic body of different shape, for example a band, wetted with mercury are alternatively moved through the electrolyte to be electrolyzed and then through a mercury sump. It is also possible to use a construction which allows the mercury to trickle down over an inclined or vertical metal surface.

Owing to the reduced separating potential of mercury, the electrolysis of the hydrochloric acid-mercury-(2)-chloride solution according to the invention requires a lower voltage than the known electrolytes of aqueous hydrochloric acid solutions, since the evolution of hydrogen at the cathode is avoided by the reduction of metal ions, added to the hydrochloric acid electrolyte, from a higher valence to a lower valence (for example, the reduction of $Fe^{+++}$-ions or $Cu^{++}$-ions to $Fe^{++}$-ions or $Cu^+$-ions). From the known normal potentials of the individual electrode reactions there are calculated the equilibrium potentials for the electrolytic equations I. $HCl = H_2 + Cl_2$ to 1.3587 v.,
II. $CuCl_2 = CuCl + \frac{1}{2}Cl_2$ to 1.0137 v., and
III. $HgCl_2 = Hg + Cl_2$ to 0.4977 v.

These values are for unit activity of the ions and the values for Equations II and III require some corrections with respect to the concentrations (or activities) attained in hydrochloric acid solutions. It is, however, obvious that the voltage for an electrolysis corresponding to one of the Equations I to III decreases in the sequence I to III.

Since, during electrolysis, there has to be assumed that an additional polarization of the electrodes is taking place, the counter voltages (polarization voltages) actually occurring can best be ascertained from the potential vs. current density curves which have been measured in known manner without current with the use of auxiliary electrodes. If from these curves the values of anode and cathode potentials $E_A$ and $E_K$ belonging to the same current density are ascertained and the polarization voltage $E_p$ is calculated from these values, according to the formula $E_p = E_A - E_K$ with consideration of the signs for $E_A$ and $E_K$, the polarization voltages, for example, on graphite electrodes are found which are illustrated in FIGURE 4 in dependence on the current density applied. Curve C of FIGURE 4 illustrates the polarization voltage in hydrochloric acid of 21% strength, curve B that in hydrochloric acid of the same concentration with an addition of copper-(2)-chloride, curve A shows the polarization voltage in hydrochloric acid of 21% strength with an addition of mercury-(2)-chloride, and curve A' that in hydrochloric acid of 21% strength with the addition of mercury-(2)-chloride and copper-(2)-chloride, each time in dependence on the current density. As becomes evident from curve B, the addition of copper-(2)-chloride already causes a considerable reduction of the polarization voltage; by the presence of mercury-(2)-chloride in the hydrochloric acid solutions the polarization voltage is again reduced considerably. The reduction in voltage, discussed above for the use of graphite electrodes for electrolysis according to the present invention, can also be noted in other electrode combinations, for example a graphite anode with a rigid cathode made, for example, of a metal wetted with mercury (such as copper or nickel), or of metal alloys (such as Monel metal) which, in the amalgamated condition, do not possess a substantial overvoltage for the separation of mercury but show a sufficient resistance to corrosion with regard to hydrochloric acid-mercury-(2)-chloride solutions. Moreover, voltage is reduced when hydrochloric acid-mercury-(2)-chloride solutions are electrolyzed between a graphite anode and a liquid cathode, especially mercury.

The concentration of the mercury-(2)-chloride in the electrolyte likewise plays an important part. At low current density, only mercury, which has a low voltage requirement, is separated at the cathode from hydrochloric acid solutions of mercury-(2)-chloride. However, since hydrogen is evolved if the current density is increased beyond the value required for this separation at the prevailing concentration of mercury-(2)-chloride, the electrolysis must be effected with a current density which is below this critical limit of current density. If hydrochloric acid solutions of various mercury-(2)-chloride-concentrations are subjected to electrolysis and if among the current density-potential-curves determined in known manner, those current density-values are determined in which the evolution of hydrogen starts at the cathode (=limiting current density), there results for said limiting current density the connection between limiting current density and mercury-(2)-chloride concentration illustrated in FIGURE 5. In the area between the axis of abscissas OG and the curve OF, a separation of mercury takes place but no evolution of hydrogen, whereas in the area situated above curve OF an additional undesired evolution of hydrogen occurs. FIGURE 5 illustrates, by way of example, that with a $HgCl_2$-concentration of 100 grams per liter, the cathodic current density of about 630 a./m.$^2$ must not be exceeded in order totally to avoid undesired evolution of hydrogen. The limiting current density depends also on the kind of electrodes, i.e., the overvoltage of hydrogen generation, and on the concentration of the hydrochloric acid in the electrolyte.

In comparison with the known processes for the electrolytic preparation of chlorine from hydrogen chloride, the process of the present invention involves the advantage that the expenditure of electrical energy required for the electrolysis is considerably lower than that of the known processes. In view of the fact that the process of the present invention avoids the formation of hydrogen at the cathode, electrolysis is essentially simplified in comparison with the known processes. An undesired contamination by gaseous hydrogen of the chlorine that has formed is thus avoided. Moreover, it is not necessary to take special precautions in order to avoid a reoxidation.

In the following Examples 1–5 there is described the reaction of an aqueous hydrochloric acid solution with air and metallic mercury, with or without the addition of a catalyst, to obtain mercury-(2)-chloride. They, more particularly, illustrate the activity of the catalysts and the practicability of this stage of the reaction according to the process of the invention.

Example 6 describes a series of experimental data from which the considerable voltage reduction during the electrolysis according to the process of the invention in comparison to the known processes is obvious.

Examples 7 discloses by way of example a method for carrying out the continuous electrolysis of a hydrochloric acid-$HgCl_2$-solution between graphite electrodes and Example 8 that between graphite anodes and a mercury cathode, whereby chlorine free from hydrogen is obtained, whereas Example 9 describes the practicability of the regeneration of an electrolytic solution poor in $HgCl_2$.

According to Examples 10–16 the same method of operating as that disclosed in Examples 2–4 was used to illustrate the effect of varied operating conditions and of various additions on the course of the conversion of mercury into mercury-(2)-chloride.

The process of the invention can, of course, also be carried out with devices and concentrations of the solutions other than those mentioned in the following examples.

The following examples serve to illustrate the invention without limiting it thereto:

EXAMPLE 1

A glass tube having a diameter of 5 cm. and a length of 60 cm. is charged with glass beads and provided at its bottom part with a supply pipe for air and a delivery pipe for mercury and hydrochloric acid and at its top part with a delivery pipe for air and a supply pipe for mercury and hydrochloric acid. The glass tube is charged with hydrochloric acid of 21% strength. While air in a finely subdivided condition is blown in through a glass frit at the bottom part of the column with a velocity of 300 to 350 liters per hour, about 30 milliliters of hydrochloric acid of 21% strength and about 60 milliliters of finely subdivided mercury are allowed to drop in per hour, the hydrochloric acid from above and the mercury through a suitable dropping device. The temperature is maintained at room temperature. After about 6 hours only a slight amount of mercury has dissolved in the hydrochloric acid that has collected (content of the glass column and the delivery pipe).

EXAMPLE 2

In a glass flask having a capacity of 500 milliliters and provided with a stirrer, conduits for supplying and delivering air, a condenser and a thermometer, about 15 grams of mercury are stirred for 9 hours at 70° C. in 250 milliliters of hydrochloric acid of about 23% strength, while passing air therethrough. After 2 hour periods an analytical sample is withdrawn, the mercury-(2)-chloride contained therein is analytically determined in known manner and recalculated on the starting volume of the solution. The values given in Table 1 were determined for the dissolved amount of mercury which are expressed in milli-equivalents so as to readily compare them with the results of the following examples.

*Table 1*

| Sample withdrawn after (hours) | 2 | 4 | 6 | 7 | 8 | 9 |
|---|---|---|---|---|---|---|
| Dissolved amount of mercury in milliequivalents | 0.35 | 0.70 | 1.83 | 3.56 | 6.33 | 8.94 |

The amounts of mercury dissolved were considerably larger than those of Example 1. The rate of oxidation of mercury in pure hydrochloric acid even at an elevated temperature has proved, also in this case, still to be too low for an industrial use.

EXAMPLE 3

In the flask described in Example 2, 4.31 grams of anhydrous iron-(3)-chloride are dissolved in 250 milliliters of hydrochloric acid of about 21% strength, and 13.47 grams of mercury are stirred therein at 70° C. while passing air therethrough at a rate of 120 liters per hour. Every 2 hours an analytical sample is withdrawn from the hydrochloric acid and the mercury-(2)-chloride and iron-(2)-chloride contents are analytically determined and recalculated on the total amount of liquid of 250 milliliters. From the values determined there is calculated the total amount, given in milli-equivalents, of the mercury which has oxidized, furthermore the amount and proportion of oxidation effected by the introduction of atmospheric oxygen into the mixture of mercury and hydrochloric acid, and the amount of mercury oxidized by iron-(3)-chloride present, as determined every two hours. The values are given in Table 2.

*Table 2*

| Duration of experiment in hours (from the beginning of the experiment) | Amount of Hg dissolved altogether | | Amount of mercury oxidized by $FeCl_3$, milli-equ. | Amount and proportion of mercury oxidized by atmospheric oxygen | |
|---|---|---|---|---|---|
| | G. | Milli-equ. | | Milli-equ. | Percent |
| 2 | 2.603 | 25.90 | 25.90 | 0.00 | 0.00 |
| 4 | 5.850 | 58.20 | 16.25 | 41.95 | 72.05 |
| 6 | 8.890 | 88.50 | 6.25 | 82.25 | 92.90 |
| 8 | 10.940 | 109.00 | 3.76 | 105.24 | 95.60 |

It results from Table 2 that the rate of oxidation, as compared with that of Example 2, has considerably increased and that the mercury is preponderantly oxidized by the introduction of atmospheric oxygen. The iron salt that has been added is found at the end of the experiment chiefly as trivalent iron, i.e., 1 mol of $FeCl_2$:6.13 mols of $FeCl_3$, so that iron-(3)-chloride has chiefly acted as oxygen carrier for the oxidation of mercury.

EXAMPLE 4

In the flask described in Examples 2 and 3, 20.54 grams of mercury are treated for 7 hours in 300 milliliters of hydrochloric acid of about 21% strength containing 5.25 grams of $CuCl_2$, while introducing air at a rate of 120 liters per hour and heating the mixture to a temperature of 70° C. Analytical samples are withdrawn every hour, their contents of mercury-(2)-chloride, copper-(2)-chloride and copper-(1)-chloride are analytically determined and converted into the starting volume. In addition there is determined the amount of mercury which has oxidized in view of the presence of atmospheric oxygen and by the reduced quantity of copper (i.e., in correspondence with the amount of copper-(1)-chloride that has been present). The results are described in Table 3.

Table 3

| Duration of experiment in hours (from the beginning of the experiment) | Total amount of dissolved mercury | | Amount of mercury oxidized by $CuCl_2$, milli-equ. | Amount and proportion of mercury oxidized by atmospheric oxygen | |
|---|---|---|---|---|---|
| | G. | Milli-equ. | | Milli-equ. | Percent |
| 1 | 4.10 | 40.60 | 22.19 | 18.41 | 45.30 |
| 2 | 7.72 | 76.75 | 31.80 | 44.95 | 59.20 |
| 3 | 11.80 | 117.10 | 28.60 | 88.50 | 75.60 |
| 4 | 13.08 | 130.10 | 9.00 | 121.00 | 93.10 |
| 5 | 16.76 | 161.50 | 5.34 | 156.16 | 96.70 |
| 6 | 18.87 | 187.50 | 1.56 | 185.94 | 99.10 |
| 7 | 20.50 | 204.20 | 2.18 | 202.02 | 98.90 |

In this experiment it is evident by the discoloration and from the figures in column 4 of Table 3 that the mercury is still oxidized by way of the conversion of copper-(2)-chloride into copper-(1)-chloride. According to the results given in the last column the proportion of mercury that is oxidized during the process by the action of atmospheric oxygen rapidly increases to approximately 100%. Copper-(2)-chloride acts, just as the iron-(3)-chloride described in the preceding example, only as a catalyst to carry atmospheric oxygen onto the mixture mercury-hydrochloric acid.

EXAMPLE 5

A glass tube in vertical position, having a diameter of about 5 cm. and a length of 120 cm. is maintained at a temperature of 65° C. by means of a hot-water jacket. Through a frit finely subdivided air is blown from below into the glass tube at a rate of 11 to 26 litres per hour. The glass tube is filled with 1350 milliliters of hydrochloric acid of about 21% strength, which contains 71.8 grams per liter of copper-(2)-chloride. A dropping device allows 600 grams of finely subdivided mercury to drop within 50 minutes through the hydrochloric acid. After said period there are obtained altogether 6.45 grams of mercury-(2)-chloride in the aqueous hydrochloric acid solution. The rate of oxidation, i.e., the amount of mercury dissolved per hour according to the process of this example in comparison to the method of operating described in Examples 2 to 4, is considerably increased. When operating as described in Example 5, a greater amount of mercury can be dissolved at a lower temperature, for example at 53° C., than that dissolved according to Examples 2 to 4.

EXAMPLE 6

The following solutions are prepared one after the other: (a) hydrochloric acid of 21% strength, (b) hydrochloric acid of 21% strength containing 65 grams per liter of crystallized copper chloride ($CuCl_2.2H_2O$) dissolved therein, (c) hydrochloric acid of 21% strength containing 500 grams per liter of mercury-(2)-chloride dissolved therein, (d) hydrochloric acid of 21% strength containing 500 grams per liter of mercury-(2)-chloride+65 grams per liter of crystallized copper chloride ($CuCl_2.2H_2O$) dissolved therein. The solutions a, b, c and d are electrolyzed one after the other between the combinations of electrodes named in the following Table 4 in the same electrolytic cell, more particularly at the same size and at the same distance of the electrodes. The individual curves of current potential are determined and by comparing them with the curve of current potential of pure hydrochloric acid of the same concentrations (solution a) there is ascertained the reduction in voltage effected by the afore-named additions, when various current densities are applied.

Table 4

| Electrolyte designation | Content | Combination of electrodes | | Reduction in voltage | |
|---|---|---|---|---|---|
| | | Anode | Cathode | V. | At a current density of $a./m.^2$ |
| b | HCl; $CuCl_2$ | Graphite | Graphite | 0.55 | 250 |
| | | | | 0.59 | 500 |
| | | | | 0.61 | 750 |
| | | | | 0.61 | 1,000 |
| | | | | 0.59 | 1,250 |
| c | HCl, $HgCl_2$ | do | do | 0.76 | 250 |
| | | | | 0.82 | 500 |
| | | | | 0.82 | 750 |
| | | | | 0.80 | 1,000 |
| | | | | 0.79 | 1,250 |
| d | HCl, $HgCl_2$+$CuCl_2$ | do | do | 0.83 | 250 |
| | | | | 0.87 | 500 |
| | | | | 0.89 | 750 |
| | | | | 0.87 | 1,000 |
| | | | | 0.87 | 1,250 |
| c | HCl, $HgCl_2$ | do | Mercury | 1.08 | 250 |
| | | | | 1.15 | 500 |
| | | | | 1.13 | 750 |
| | | | | 1.15 | 1,000 |
| | | | | 1.11 | 1,250 |
| | | | | 1.16 | 1,500 |
| d | HCl, $HgCl_2$+$CuCl_2$ | do | do | 0.86 | 250 |
| | | | | 0.90 | 500 |
| | | | | 0.88 | 750 |
| | | | | 0.86 | 1,000 |
| | | | | 0.82 | 1,250 |
| | | | | 0.77 | 1,500 |
| c | HCl, $HgCl_2$ | do | Monel | 0.72 | 250 |
| | | | | 0.75 | 500 |
| | | | | 0.71 | 750 |
| | | | | 0.68 | 1,000 |
| | | | | 0.67 | 1,250 |
| | | | | 0.64 | 1,500 |
| d | HCl, $HgCl_2$+$CuCl_2$ | do | do | 0.75 | 250 |
| | | | | 0.79 | 500 |
| | | | | 0.74 | 750 |
| | | | | 0.69 | 1,000 |
| | | | | 0.61 | 1,250 |
| | | | | 0.59 | 1,500 |

It is evident from Table 4 that the presence of mercury-(2)-chloride, in comparison with the known copper-(2)-chloride, brings about a considerable reduction of the electrolytic voltage. The presence of copper-(2)-chloride in hydrochloric acid which contains mercury-(2)-chloride influences the voltage values only insignificantly, contrary to the part played by copper-(2)-chloride in hydrochloric acid which is free from additions of mercury-(2)-chloride. What has been said with regard to the part of copper-(2)-chloride during the electrolysis, holds true in the same way with regard to iron-(3)-chloride which is likewise used as oxidation catalyst.

Example 7

In a close electrolytic cell which is provided with conduits for supplying and delivering the electrolyte and the mercury and with a gas delivery pipe for the generated chlorine gas, a solution containing 228.2 grams per liter of hydrochloric acid (HCl), 250 grams per liter of mercury-(2)-chloride and 37.7 grams per liter of copper-(2)-chloride, is electrolyzed between graphite electrodes with a current intensity which corresponds to a cathodic and anodic current density of 1500 $a./m.^2$. The solution is run twice through the cell at a rate of about 2.15 liters per hour, whereupon the concentration of hydrochloric acid and copper chloride is substantially unaltered. The concentration of mercury chloride, however, has reduced to 235 grams per liter. The generated chlorine is free from hydrogen, only mercury compounds have been reduced at the cathode.

*Example 8*

A closed electrolytic cell which, in principle, is a copy of the usual cells for an alkali metal chloride electrolysis according to the mercury process contains in the electrolytic cell, which is gas-tight and impermeable to liquids, a horizontally mounted mercury cathode having an electrode surface of 125 cm.$^2$, and superposed thereon, 2 horizontally mounted graphite anodes (the bottom of each having a size of 50 cm.$^2$) which are provided with bore holes through which chlorine is removed. It is furthermore provided with means for the inlet and outlet of mercury, for example with siphons, a conduit each for the supply and the delivery of mercury and the electrolyte, an outlet for chlorine (from the upper part of the cell), a thermometer, a manometer and connecting means for controlling devices. While the anode and cathode are given a potential difference by means of a connected source of current, the electrolyte which has been preheated to a temperature of 85° C. and which contains 220.4 grams per liter of hydrochloric acid, 251.6 grams per liter of mercury-(2)-chloride and 43.0 grams per liter of copper-(2)-chloride is allowed to fill the cell. During the passage of the current the electrolyte flows (at a rate of 0.4 liter per hour) through the cell and at the same time mercury enters and leaves the cell in counter-current to the electrolyte. The cell is charged, on an average, with 12.67 a. (corresponding to a current density of 1267 a./m.$^2$ anodically or 1013 a./m.$^2$ cathodically) and, at the temperature of 47° C. to 50° C. within the cell it has an average voltage of 1.435 v. The chlorine generated at the anode within the cell is collected and analyzed. It is free from hydrogen. The electrolyte which flows off contains 222.6 grams per liter of HCl, 153.1 grams per liter of HgCl$_2$, 43.3 grams per liter of CuCl$_2$ and 0.7 gram per liter of dissolved chlorine. By analytically determining the content of mercury in the electrolyte before entering and after leaving the cell and measuring the flow of the electrolyte, the current yield at the cathode and by absorption of the chlorine in NaOH the current yield at the anode are determined. Under the aforenamed conditions the yield at the cathode amounts to 86% and at the anode to 80%. Hence results an expenditure of energy of 1.35 kwh./kg. of chlorine generated from the cell.

Yield of current and expenditure of energy depend on (*a*) the distance of the electrodes, (*b*) the conductivity of the electrolyte, (*c*) the passage of the currents of liquid in the cell, (*d*) the temperature and (*e*) the charge of the cell.

*Example 9*

In the same apparatus as that used in Examples 2 to 4, 67.6 grams of metallic mercury are introduced into 300 milliliters of an electrolyte which contains 330 grams per liter of mercury-(2)-chloride and 65.3 grams per liter of copper-(2)-chloride. The whole is stirred while passing air therethrough. After 29 hours the amount of mercury has dissolved. As ascertained by analysis the electrolyte contains 629 grams per liter of mercury-(2)-chloride and can be re-used for electrolysis.

*Example 10*

By stirring, instead of the solution used in Example 4, a solution of 30.43 grams of mercury in 400 milliliters of hydrochloric acid of about 21.5% strength to which 38.72 grams of copper-(2)-chloride have been added, at a temperature of 93° C., while air is passed through the solution in the manner described in Examples 2 to 4, 401 milli-equivalents of Hg are dissolved in the course of 1 hour in 1 liter; 213 milli-equivalents thereof have been oxidized during this period by the atmospheric oxygen that has been added.

*Example 11*

400 milliliters of hydrochloric acid of about 21.5% strength are mixed with 50 grams of titanium-(4)-chloride and, while introducing air, the mixture is stirred at a temperature of 87° C. with 29.58 grams of mercury. The solution obtained after 7 hours contains 24.3 milli-equivalents of mercury-(2)-chloride.

EXAMPLE 12

The same proportion of hydrochloric acid of the same HCl-concentration as that described in Example 11 is mixed with 8.7 grams of potassium perrhenate. Air is passed through the mixture and it is stirred at a temperature of 89° C. and after about 9 hours 50.6 milli-equivalents of mercury have been dissolved in the form of mercury-(2)-chloride.

The addition of titanium-(4)-chloride as described in Example 11 and of potassium perrhenate as described in Example 12 causes the mercury to dissolve much more rapidly, in comparison to the action of pure hydrochloric acid as used in Example 2.

EXAMPLE 13

20 grams of sodium molybdate are dissolved in 400 milliliters of hydrochloric acid of about 21.5% strength and the solution is stirred at a temperature of 87° C. with 29.7 grams of mercury, while introducing air at a rate of 250 liters per hour. After 8 hours the mercury has essentially converted into calomel. After an addition of 50 grams of CuCl.2H$_2$O to the aforedescribed batch the oxidation is substantially terminated at a temperature of 84° C. after 1 hour, i.e., within that 1 hour the content of mercury-(2)-chloride is increased by 740 milli-equivalents (calculated per 1 liter of solution and 1 hour's reaction). Reckoning from the amount of copper-(1)-chloride that has formed during this period, 503 milli-equivalents have been oxidized by atmospheric oxygen.

An addition of molybdate has a similar favorable action on the dissolution of mercury when, from the outset, a small or a large proportion of copper-(2)-chloride is present, as is evident from the following experiment:

*Table 5*

| Additions to 400 ml. HCl of about 21.5% strength | | Dissolution of mercury, milli-equ./l.-h. | Oxidized by air, milli-equ./l.-h. |
| --- | --- | --- | --- |
| Sodium molybdate, g. | Copper-(2)-chloride, g. | | |
| 14.44 | 5.3 | 70.4 | 64.5 |
| 16.0 | 32.9 | 276.7 | 159.0 |

EXAMPLE 14

The action of the vanadates is similar to that of the molybdates. 20.83 grams of NaVO$_3$, dissolved in 400 milliliters of HCl, yield with mercury and air at 86° C. partly calomel and partly mercury-(2)-chloride. After the addition of 33.48 grams of copper-(2)-chloride the calomel and the residual portions of mercury rapidly dissolve, a dissolution of mercury of 352 milli-equivalents per hour and liter and an atmospheric oxidation of mercury of 321.8 milli-equivalents per hour and liter being attained.

A combination of molybdate, vanadate and copper-(2)-chloride likewise shows a good catalytic action during the oxidation. 670 milli-equivalents of mercury can be dissolved per hour and liter by reacting 19.75 grams of NaVO, 19.89 grams of Na$_2$MoO$_4$ and 39.42 grams of CuCl$_2$ with 400 milliliters of hydrochloric acid of about 21% strength, 30.26 grams of Hg and air.

EXAMPLE 15

As illustrated in Examples 13 and 14, the action of molybdates and vanadates can be increased by the addition of $CuCl_2$, or vice versa the catalytic action of $CuCl_2$ during the dissolution of mercury can be increased by the addition of vanadates and/or molybdates. The mutual influence of iron and copper compounds is, however, not very considerable.

4.16 grams of $FeCl_3$ and 3.16 grams of $CuCl_2$, dissolved in 300 milliliters of HCl of about 21.5% strength yield at a temperature of 78° C. a dissolution of 127 milli-equivalents of mercury in the course of 7 hours.

An addition of manganese-(2)-sulfate, however, causes an improvement of the catalytic action of iron, as illustrated in the following Table 6, in hydrochloric acid of 21.5% strength at 75° C.

Table 6

| HCl volume, ml. | Additions | Dissolution of mercury, milli-equ./l-h. | Atmospheric oxidation of mercury milli-equ./l.-h. |
| --- | --- | --- | --- |
| 250 | 4.31 g. $FeCl_3$ | 54 | 52.4 |
| 300 | 5.63 g. $FeCl_3$<br>1.1 g. $MnSO_4$ | 69 | 66.6 |

EXAMPLE 16

The action of copper-(2)-chloride can be influenced by the addition of other metal compounds which are capable of changing valency; this has already been illustrated in Examples 13 and 14. A palladium-chloride addition and a cobalt-chloride addition to the hydrochloric acid-copper-(2)-chloride solution act in the same manner.

In a manner analogous to that described in the preceding examples, the experiments with these additions have been carried out in 400 milliliters of HCl of about 21.5% strength. The results obtained are illustrated in Table 7.

Table 7

| Addition | Temperature, °C. | Dissolution of mercury, milli-equ./l.-h. | Atmospheric oxidation of mercury, milli-equ./l.-h. |
| --- | --- | --- | --- |
| $CuCl_2$, 27.32 g.<br>$PdCl_2$, 0.2 g. | 91 | 135 | 134 |
| $CuCl_2$, 39.6 g.<br>$CoCl_2$, 19.8 g. | 91 | 245 | 189 |

By this addition the re-oxidation of copper-(1)-chloride which has intermediarily formed during the dissolution of the mercury is particularly favored.

It is evident from Examples 2–5 and 9–16 that a number of metal salts having a varying valency, when applied alone or in combination with each other, are capable of catalyzing the reaction of mercury with hydrogen chloride and oxygen in an aqueous phase in correspondence with the process of the invention.

We claim:

1. In an electrolytic process for the production of chlorine from aqueous hydrochloric acid, the steps which comprise: (A) reacting aqueous hydrochloric acid, at a temperature between at least 40° C. and the boiling point of said aqueous hydrochloric acid, with an oxygen-containing gas and metallic mercury, in the presence of a catalyst consisting of at least one salt of a metal having at least two different valence states, to form dissolved mercury-(2)-chloride, the catalytic metal salt in its higher valence state having sufficient oxidizing power to oxidize metallic mercury and mercury-(1)-chloride and in its lower valence state being capable of reoxidation to the higher valence state by oxygen in said oxygen-containing gas; (B) electrolyzing the resulting aqueous solution, containing mercury-(2)-chloride, between an anode and a cathode to form chlorine at the anode and metallic mercury at the cathode; (C) reconducting metallic mercury separated at the cathode to a stock of mercury serving for preparation of further mercury-(2)-chloride; (D) freeing electrolyzed electrolyte, poor in mercury-(2)-chloride, from its chlorine content and recycling the electrolyte for reaction with metallic mercury and said oxygen-containing gas to form further mercury-(2)-chloride according to step (A); and (E) withdrawing from the cycle water formed by the oxidation of metallic mercury to mercury-(2)-chloride.

2. The process as in claim 1 wherein said oxygen-containing gas is pure oxygen.

3. The process as in claim 1 wherein said oxygen-containing gas and said metallic mercury are reacted in finely divided form with said aqueous hydrochloric acid.

4. The process as in claim 1 wherein said anode is a graphite anode and said cathode is a solid cathode of a member selected from the group consisting of graphite and metals having a low overvoltage for the separation of mercury.

5. The process as in claim 1 wherein last anode is a graphite anode and said cathode is a mercury cathode.

6. The process as in claim 1 wherein the electrolysis in step (B) is performed at a current density which is below the limiting current density required for the evolution of hydrogen at the cathode.

7. The process as in claim 1 wherein the electrolyzed electrolyte of step (D) is contacted with gaseous hydrogen chloride to form aqueous hydrochloric acid therein prior to recycling.

8. The process as in claim 1 wherein the solution resulting from step (A) is contacted with gaseous hydrogen chloride to form aqueous hydrochloric acid therein prior to performing step (B).

9. The process as in claim 1 wherein water is withdrawn from the cycle by volatilization and subsequent condensation, whereby the hydrogen chloride content of the resulting condensate is at most equal to the content of hydrogen chloride in an azeotropic $HCl-H_2O$ mixture.

10. The process as in claim 9 wherein said condensate, subsequent to its formation, is saturated with gaseous hydrogen chloride to form concentrated hydrochloric acid.

11. The process of claim 1 wherein said oxygen-containing gas is air.

12. The process of claim 1 wherein said aqueous hydrochloric acid, oxygen-containing gas, and metallic mercury are reacted at a temperature between 60° and 100° C.

References Cited in the file of this patent

UNITED STATES PATENTS 2,666,024     Low et al.               Jan. 12, 1954

OTHER REFERENCES

Thorpe's Dictionary of Applied Chemistry, 4th Ed., vol. VII, 1946, page 571.